Dec. 29, 1925.
H. WEBER
WATER COCK
Filed May 5, 1925
1,567,349
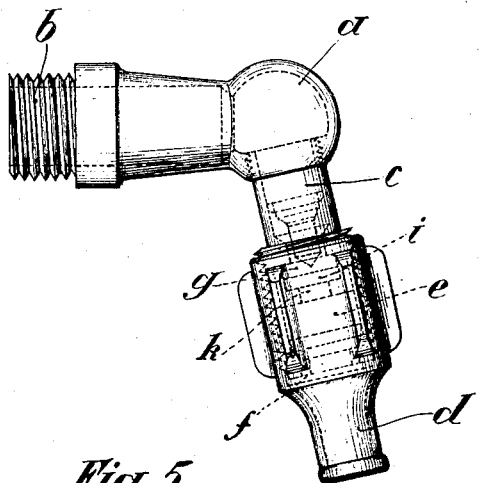
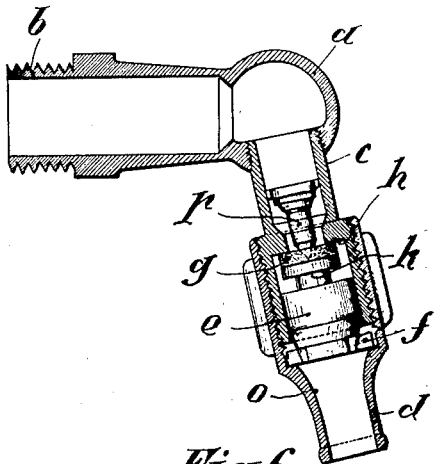
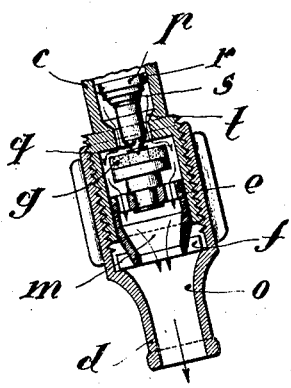
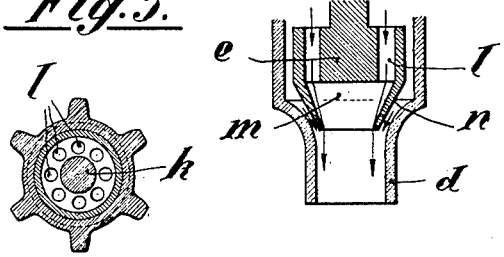
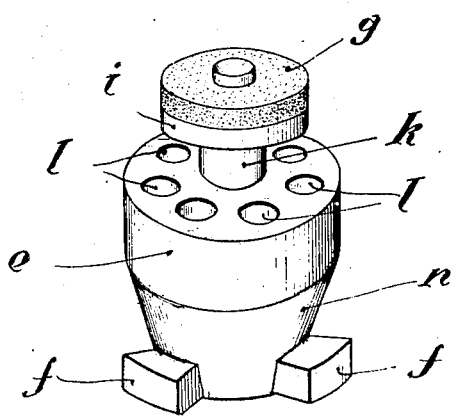
Inventor.
Heinrich Weber
By
Attorney.

Patented Dec. 29, 1925.

1,567,349

UNITED STATES PATENT OFFICE.

HEINRICH WEBER, OF FEUERBACH-STUTTGART, GERMANY.

WATER COCK.

Application filed May 5, 1925. Serial No. 28,128.

*To all whom it may concern:*

Be it known that I, HEINRICH WEBER, a citizen of Germany, residing at Feuerbach-Stuttgart, Wurttemberg, Germany, have invented certain new and useful Improvements in Water Cocks, of which the following is a specification.

The present invention relates to water cocks for water pipes of the kind in which a closing member is forced into the closing position by an outlet nozzle adapted to engage with the outlet branch of the cock by means of a screw thread. In cocks of the aforesaid kind there is an ever present danger of water leaking from the cock especially in high pressure pipes, the said leakage water rising between the screw threads so that there is a continuous or almost constant drip from the tap, frequently resulting in a deposit between the screw threads and consequently rendering the cocks more or less useless.

The present invention avoids these disadvantages in that the invention provides for a compulsory or forcible conservation of the leakage water. The device consists in that the issuing water produces a suction action and that the cut-off member through which the water flows is provided externally with conical or tapered portions which in common with a reduced portion on the outlet nozzle form suction passages through which leakage water is sucked up. This suction action once produced causes the leakage water to be discharged in an inclined direction into the outflowing water. This jet exerts a suction action which withdraws the whole of the leakage water and prevents any rise of the same between the screw threads. The outlet opening of the cut-off member is for this purpose somewhat less than the outlet opening of the outlet nozzle so as to increase the suction action.

A further advantage of the cock according to the present invention consists in that the cut-off member is formed simultaneously as a jet regulator and for this purpose is provided with passages for the through-way passage of the water, the said passages being disposed parallel to the axis of the outlet branch, the said passages being arranged and distributed round the upper portion of the cut-off member.

The cock is provided with a further cut-off valve which is supported on the cut-off member and is retained in the up position by the said cut-off member as long as the screw threaded casing is engaged with most of the corresponding screw threaded branch of the cock. Just before removal of the same the cut-off valve is forced onto its seat by the pressure of the water so that no water can issue from the cock.

In order that the invention may be clearly understood and readily carried into effect, reference is made to the accompanying drawing which shows by way of example a constructional form in accordance with the present invention.

Figure 1 shows a cock in side elevation provided with the improvements in accordance with the present invention.

Figure 2 is a sectional view.

Figure 3 is a cross section.

Figure 4 is a perspective view showing the cut-off member.

Figure 5 is an axial section through the outlet nozzle.

Figure 6 is a sectional diagram in order to explain the production of the suction action.

The body $a$ of the cock is of the known angular form and the water flows through the branch $b$ and is led thereafter through the branch $c$. An outlet nozzle $d$ is screwed onto the branch $c$ in known manner which outlet nozzle forces a loose cut-off member $e$ against the through-way passage of the branch $c$ and thereby closes the outlet. The application of the member $e$ is obtained in such manner that it is supported by means of an interrupted flange $f$ on a projection on the interior of the nozzle $d$. The closing member $e$ (see Figure 4) is provided at the top with a packing disc $g$ which in the closing position is forced against a face $h$ provided in the interior of the branch $c$ which face forms a valve seat. The member $e$ fits the bore of the branch $c$ while the packing disc $g$ is smaller than the said bore so that the water can flow past the packing disc $g$. The disc $g$ lies against the disc or plate $i$ which is mounted on a spindle $k$ and is spaced a suitable distance apart from the member $e$ so as to leave a suitable space between the said plate and the upper face of the member $e$.

The upper part of the member $e$ is provided with through-way passages $l$ disposed parallel to the axis of the spindle $k$, the said passages being of comparatively small diameter and distributed round the face of the upper portion of the member *e*. The passages *l* debouch into a space *m* below the upper portion of the member *e* whose outlet opening is smaller than the opening of the reducing nozzle *d* disposed thereunder.

The member *e* is further provided on its exterior with a conical or tapered surface *n* which, together with the interior conical portion *o* of the outlet nozzle *d* forms a suction passage which lies at an inclination to the direction of flow of the outlet water so that the leakage water which penetrates between the body *e* and the support *c* is forcibly sucked up. The passages *l* act as jet regulators.

In order to prevent the outflow of water when the nozzle *d* is fully unscrewed, a second cut-off member *p* is provided. This is supported on the top of the member *e* by means of a pointed end *q* and is guided by means of a projection or projections *r* in the upper bore of the branch *c*. When the valve *p* falls sufficiently as in unscrewing the nozzle *d*, its conical portion *s* then rests on a correspondingly formed conical recess *t* in the branch *c*.

What I claim is:—

1. A water-cock comprising in combination a water-supply branch pipe, a water discharge branch pipe, interconnected with the water-supply branch pipe, a nozzle adapted for connection with the said water discharge branch and a member disposed in the interior of the water discharge branch pipe and adapted to co-operate with the bore of the discharge nozzle to create a suction effect in order to prevent leakage of water from the cock when in use.

2. A water cock comprising a discharge branch pipe; a cut-off member in said pipe, said member comprising a plurality of passages for the water, an interrupted flange at the lower end, and a packing disc at the upper end; and a discharge nozzle adapted for connection to the branch pipe and adapted to actuate said member by means of said flange.

3. A water-cock comprising a discharge branch pipe, a cut-off valve in the bore thereof, a chamber below the said bore and a cut-off member in the said chamber adapted to co-operate with the bore of a discharge nozzle connected with the discharge branch pipe so as to create a suction effect and prevent leakage of water when the cock is in use.

4. A water-cock comprising a water-discharge nozzle, and a water-cut-off member adapted to co-operate with the interior of the discharge nozzle so as to create a suction effect and cause any leakage water to be entrained with the water normally outflowing from the cock.

5. A water-cock comprising a cut-off member having a hollow interior and a lower nozzle-like end having its exterior surface formed to co-operate with the bore of a discharge nozzle connected with a water-discharge branch whereby to create a suction effect and cause any leakage water to be entrained with the water normally outflowing.

6. A water-cock comprising a discharge nozzle adapted to be connected with a water-delivery pipe, a cut-off member disposed in said pipe and having a cylindrical upper portion and an externally conical lower portion adapted to co-operate with a correspondingly shaped internal part of the discharge nozzle to prevent the leakage of water from the cock when normally in use.

7. A water-cock comprising a cylindro-conical cut-off member, a valve provided at the upper end thereof and spaced apart from the upper portion of the cylindro-conical member and rigidly connected therewith, a valve seat provided in the bore of a branch delivery pipe in which the said member is disposed and means to axially displace the cut-off member whereby to control the flow of water from the cock.

8. A water-cock comprising a cut-off valve, a cut-off member having a hollow interior and disposed in axial alignment with the cut-off valve and in the bore of a water-discharge pipe common to both the said valve and cut-off member, a partition disposed at the upper end of the cut-off member and having through-way passages communicating with the interior of the cut-off member and means to effect axial displacement of the cut-off member in order to displace the cut-off valve.

In testimony whereof I affix my signature.

HEINRICH WEBER.